United States Patent
Bingham et al.

(10) Patent No.: US 7,603,395 B1
(45) Date of Patent: *Oct. 13, 2009

(54) USING PSEUDOSNAPSHOTS FOR CONTINUOUS DATA PROTECTION SYSTEMS TO SURFACE A COPY OF DATA

(75) Inventors: Scott Forrest Bingham, Sammamish, WA (US); Upanshu Singhal, Redmond, WA (US); John C. Rokicki, Rutland, MA (US); Matthew D. Buchman, Seattle, WA (US); Venkatesha Murthy, Milford, MA (US)

(73) Assignee: EMC Corporation, Hopkinton, MA (US)

(*) Notice: Subject to any disclaimer, the term of this patent is extended or adjusted under 35 U.S.C. 154(b) by 145 days.

This patent is subject to a terminal disclaimer.

(21) Appl. No.: 11/381,347

(22) Filed: May 2, 2006

(51) Int. Cl.
*G06F 17/30* (2006.01)
(52) U.S. Cl. ...................................... 707/204
(58) Field of Classification Search ........................ None
See application file for complete search history.

(56) References Cited

U.S. PATENT DOCUMENTS

| 7,007,043 B2 | 2/2006 | Farmer et al. |
| 2005/0193245 A1 | 9/2005 | Hayden et al. |
| 2006/0020762 A1 | 1/2006 | Urmston |
| 2006/0129613 A1 | 6/2006 | Goodman et al. |
| 2007/0011137 A1 | 1/2007 | Kodama |
| 2007/0033356 A1 | 2/2007 | Erlikhman |
| 2007/0083567 A1 | 4/2007 | Arai et al. |
| 2007/0112894 A1 | 5/2007 | Okada et al. |
| 2007/0130214 A1 | 6/2007 | Boyd et al. |
| 2007/0198604 A1* | 8/2007 | Okada et al. ................. 707/202 |
| 2007/0226438 A1* | 9/2007 | Erofeev ....................... 711/162 |
| 2007/0245107 A1* | 10/2007 | Kano .......................... 711/163 |
| 2007/0276878 A1* | 11/2007 | Zheng et al. ................. 707/202 |

OTHER PUBLICATIONS

U.S. Appl. No. 11/381,336, filed May 2, 2006, Bingham et al.
U.S. Appl. No. 11/381,339, filed May 2, 2006, Bingham et al.
U.S. Appl. No. 11/381,343, filed May 2, 2006, Bingham et al.
U.S. Appl. No. 11/381,345, filed May 2, 2006, Bingham et al.
U.S. Appl. No. 11/381,343, filed Aug. 6, 2008, Office Action.
U.S. Appl. No. 11/381,336, filed Mar. 19, 2008, Office Action.

(Continued)

*Primary Examiner*—Don Wong
*Assistant Examiner*—Belinda Xue
(74) *Attorney, Agent, or Firm*—Workman Nydegger

(57) ABSTRACT

Systems and methods for performing replication operations on a continuous data protection system. Exemplary methods include identifying a series of transactions in a continuous data protection system, identifying an event marker indicating a point in time in the series of transactions, copying at least a portion of the series of transactions up until the point in time of the event marker from the continuous data protection system, and presenting the copy of at least a portion of the series of transactions such that the surfaced copy can be read in a subsequent replication operation.

18 Claims, 6 Drawing Sheets

OTHER PUBLICATIONS

U.S. Appl. No. 11/381,339, filed Mar. 19, 2008, Office Action.
U.S. Appl. No. 11/381,345, filed Mar. 20, 2008, Office Action.
U.S. Appl. No. 11/381,336, filed Oct. 28, 2008, Final Office Action.
U.S. Appl. No. 11/381,339, filed Sep. 29, 2008, Final Office Action.
U.S. Appl. No. 11/381,343, filed Jan. 23, 2009, Final Office Action.
U.S. Appl. No. 11/381,345, filed Oct. 14, 2008, Notice of Allowance.
U.S. Appl. No. 11/381,336, filed Apr. 16, 2009, Office Action.
U.S. Appl. No. 11/381,339, filed Apr. 16, 2009, Office Action.
Office Action dated Jul. 24, 2009 as issued in U.S. Appl. No. 11/381,343, filed May 2, 2006.

* cited by examiner

USING PSEUDOSNAPSHOTS FOR CONTINUOUS DATA PROTECTION SYSTEMS TO SURFACE A COPY OF DATA

CROSS-REFERENCE TO RELATED APPLICATIONS

This application is related to co-pending U.S. patent application Ser. No. 11/381,336, filed May 2, 2006, U.S. patent application Ser. No. 11/381,339, filed May 2, 2006, U.S. patent application Ser. No. 11/381,345, filed May 2, 2006 and issued Mar. 24, 2009 as U.S. Pat. No. 7,509,358. All of these applications are incorporated by reference herein in their entireties.

BACKGROUND OF THE INVENTION

1. The Field of the Invention

The present invention relates to systems and methods for backing up and restoring data. More particularly, embodiments of the invention relate to systems and methods for performing replication operations on a continuous data protection system.

2. The Relevant Technology

In this society where many personal and business interactions are data driven, data can become easily lost or corrupted due to events such as system failures, viruses, power outages, etc. Backing up data has become an important feature of computer networks because of this increasing dependence upon computers and networks to perform vital business and personal functions. The ability to easily, accurately and reliably access data is expected by anyone accessing a computer and/or network.

Backup and recovery of data is typically accomplished through the use of software that creates a backup copy of data and that recovers the data from the backup copy. As the amount of data continues to increase, and as the applications for creating data become more complex, backing up and recovering the data becomes more challenging. It would be advantageous to be able to restore the data at optimal points in time so that full recovery of all of the desired data is achieved without corrupting other data or processes on a computer.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
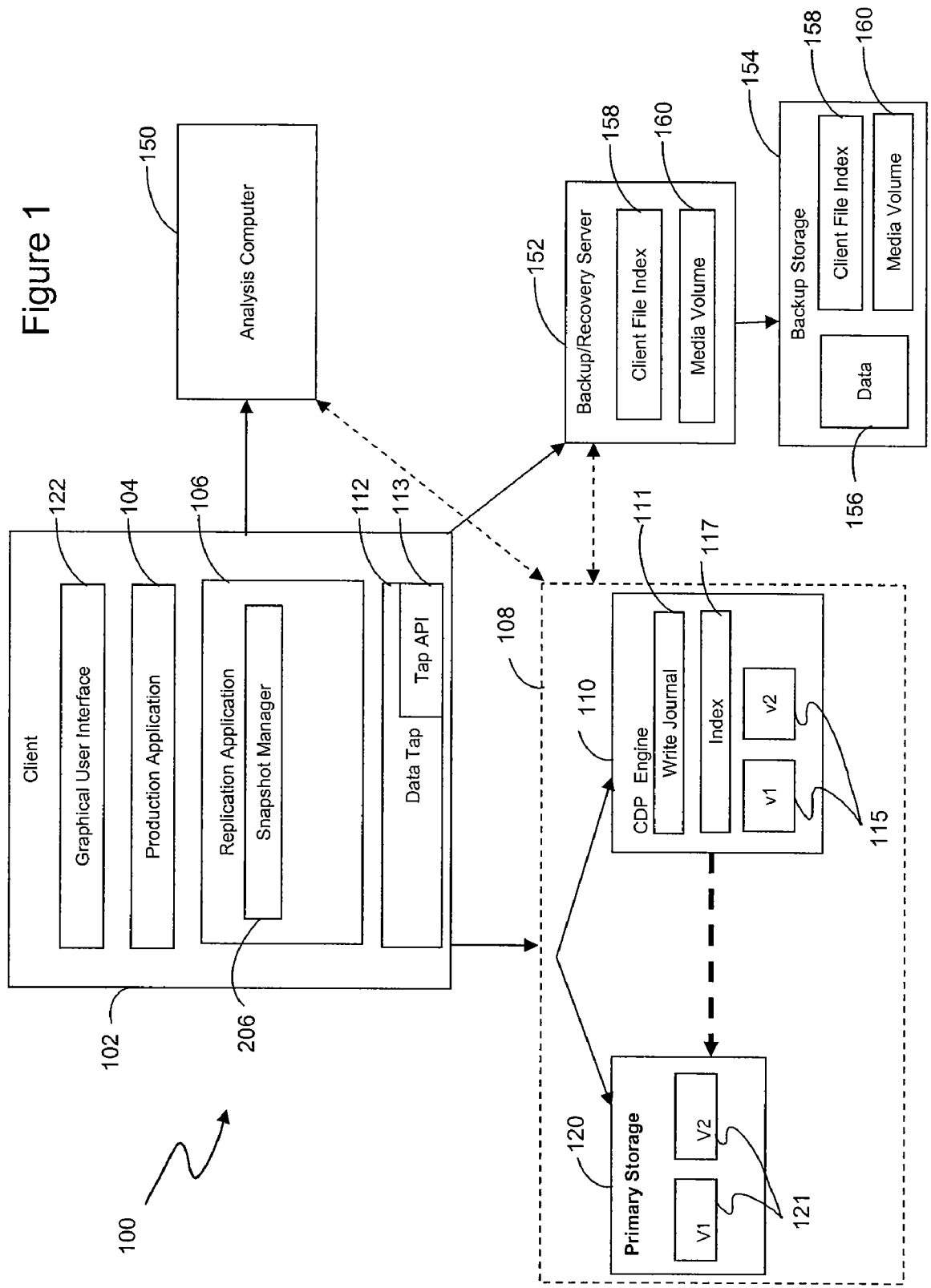
FIG. 1 illustrates an example of a system for performing replication operations on continuous data protection systems.

In the following detailed description of the various embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The principles of the present invention relate to a system configured for creating pseudosnapshots using continuous data protection (CDP) techniques and then surfacing at least a portion of the CDP data as a copy to perform various replication operations. Data from a surfaced copy can be used for mirroring functions, backup/recovery operations (e.g., disaster recovery), data mining, data consistency, as well as other analysis.

Exemplary systems include a production application residing on a computer and a CDP engine configured for continually storing changes that occur in the production application. Each time data is written by the production application that is being protected, the CDP engine is triggered and a copy of the data involved in the write operation is created and stored on the CDP engine. The CDP engine basically performs a continuous series of write operations. The CDP engine is able to retain information about every change to a selected application, directory, volume, or the like, over a long period of time, and a user can later utilize the CDP engine to access stored data as it appeared at a given point in time in the past.

The present invention provides for pseudosnapshots to be created of the data stored in the CDP engine at various points in time. If the production application becomes corrupted, a previous version of the application data may be recovered using one or more of the pseudosnapshots by surfacing a copy from the CDP engine and reading the data from the surfaced copy to recreate the data up until the time the pseudosnapshot was created.

As used herein, the term "data" may include, but is not limited to, directories (e.g., volumes, file systems, and the like), user data, system data, applications, services, operating systems, and the like, that can be stored on one or more storage devices of a computer. Backing up or recovering the operating system may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Even though data may exist on many different storage devices, data can be organized into logical directories and subdirectories so that a user can easily locate information. In one example, in Windows® operating system, the main directories are referred to as volumes. Volumes include, for example, the C drive and D drive, which are typical volumes of storage that are located on a computer, even though the C or D drive itself may comprise a collection of hard disks. It is not necessary for a user to know from which particular disk to obtain information. Thus, directories exist to help a user navigate through the data on the computer. Other directories may exist to which the computer has access through a network.

For purposes of simplicity, the term "production application" will often be used herein to describe the source of data that is being backed up. As will be described below, complex software applications benefit from the backup and restore technology disclosed herein because the data related to applications are typically subject to constant alteration. The technology disclosed herein facilitates the backup and recovery of all types of data and/or data structures, and can be particularly beneficial to applications whose data is continually changing. Although certain embodiments described herein will often refer to the backup of production applications, the technology described herein applies equally to the backup and recovery of all types of data, including directories, volumes, file systems, servers, user data, system data, services, operating systems, and the like.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as are well known in the art.

As used herein, the term "user" may refer to a person operating the server (e.g., administrator). Alternatively, the term "user" may refer to a person at a client or management console. Users are able to initiate a request for mirroring, backup and/or restore, although it will be appreciated that the server may have additional functionalities not available to the client or management console.

To facilitate the various replication functions contemplated by the present invention, pseudosnapshots can be generated in the CDP engine by creating event markers at points in time when the data is in, for example, a quiescent state. Pseudosnapshots are, thus, earmarked datasets within the CDP engine that can later be reliably surfaced as a copy. Pseudosnapshots provide the user with greater control over how data is stored to and recovered from the CDP engine. These pseudosnapshots can be recovered at a later time by reading the data that had been stored in the CDP engine at the time of the corresponding event marker. Furthermore, because pseudosnapshots consist of event markers, the number of pseudosnapshots that can be earmarked in the CDP data can be numerous because the data is surfaced to copy only when needed. Thus, numerous pseudosnapshots can be saved, reducing the amount or resources and storage.

In contrast, a conventional snapshot is a read-only point-in-time replica or representation of the original data or contents of one or more volumes. A conventional snapshot can be used to make an actual copy on another local or remote storage device. While it would be beneficial to be able to make read only replicas of data on a CDP engine at specific points in time, as is done with conventional snapshots, such use can consume storage space and resources. In order to store the same number of conventional snapshots as pseudosnapshots, a larger amount of storage would be required. Thus, the present invention allows for a reduced amount of resources and storage to be used to store numerous pseudosnapshots, if so desired. The present invention thus obviates the conflict that arises where a user would like to take advantage of the point-in-time nature of CDP, while maintaining the stability of being able to use a snapshot that was created while crucial applications on the volume were in a consistent state. The present invention provides systems and methods for integrating the benefits of CDP with snapshot technology.

Pseudosnapshots can be beneficial, for example, to facilitate data recovery after the occurrence of a disaster. A disaster may include any event in which data is lost or corrupted in any way, or when an operating system or other application is corrupted or damaged in any way that may require the operating system or application to be repaired or reinstalled. Data may be lost, damaged or corrupted in any number of ways, including a system crash, burglary, virus, human error, damage to the system, and the like. A pseudosnapshot can be used to surface a copy, which can then be used to create a backup copy of data on the CDP engine. The backup copy of data can be transferred to a backup storage medium, such as an optical disk, hard disk, floppy disk, tape, or any other storage medium that can be physically stored in a location separate from the CDP engine.

Exemplary System for Performing Replication Functions Using Continuous Data Protection FIG. 1 illustrates an exemplary system 100 for creating pseudosnapshots using continuous data protection (CDP) technology. System 100 further performs various replication functions such as mirroring and remote backup/recovery. FIG. 1 depicts a computer 102 that is in communication with a storage area network (SAN) 108. In one embodiment, computer 102 is an individual computer. In another embodiment, computer 102 is a server that is in communication with a network of client computers (not shown). In another embodiment, computer 102 is a client computer that is communicatively coupled to a central server (described below). Computer 102 can be relatively simple (e.g., a desktop computer) or relatively complex (e.g., a large database server, a cluster of servers, or a production server).

Computer 102 further includes at least one production application 104, which contains and generates data that can be stored, mirrored, backed up, recovered, data mined, and the like. As noted above, the term "production application" is merely used by way of example to further illustrate the present invention, because complex applications whose data is continually being altered can benefit from the technology disclosed herein. However, other data on computer 102 that may also undergo storing, mirroring, backing up, data mining, and the like, which data may also include directories, volumes, file systems, servers, and other types of data described previously.

Furthermore, production application 104 may be comprised of multiple applications, located on multiple computers, volumes, directories, disks, or the like. By way of example only, production application 104 may include Oracle, SAP, Microsoft Exchange, and Microsoft SQL, PeopleSoft, Seibel, among other flexible enterprise resource planning (ERP) software applications and may operate on any of various different operating systems including, by way of example, Windows, Linux, NetWare, and UNIX platforms.

Computer 102 includes at least one replication application 106 that performs various replication functions. In one embodiment, replication application 106 can be responsible for managing mirroring operations of computer 102. In another embodiment, replication application 106 may be configured to perform automated backup and recover operations of computer 102. Replication application 106 may further be configured for delivering data protection and management for direct attached storage (DAS), network attached storage (NAS), storage area network (SAN), continuous data protection (CDP) and other storage environments.

Although replication application 106 may consist of backup-restore software features from any number of manufacturers, replication application 106 may include various features, including, but not limited to, advanced indexing, high speed parallelism, automated media management, LAN-free backup, cluster awareness, and dynamic tape drive sharing. Further, replication application 106 can also coordinate creation of pseudosnapshots to perform other functions besides mirroring and backup/recovery, such as, but not limited to, data mining, data consistency analysis, and the like.

System 100 may further include a primary storage 120. Primary storage 120 may be one of many storage mediums that are commonly employed in the art to store data. Examples include, but are not limited to, disk storage (e.g., optical disks, hard disks, RAIDs, floppy disks, zip disks, and the like), tape storage (e.g., magnetic tape, paper tape), solid state memory devices (e.g., flash memory, EEPROM, and the like), as well as any other storage medium currently known in the art or developed in the future.

System 100 also includes a continuous data protection (CDP) engine 110 for recording a copy of all changes made to the data of production application 104. Computer 102 further includes a data tap 112 that serves as an interface between computer 102 and CDP engine 110. Data tap 112 consists of a software component configured to intercept all of the inputs and/or outputs that are sent to and from production application 104. Data tap 112 sends each of the changes occurring in production application 104 to CDP engine 110. In one embodiment, data tap 112 includes a CDP application programming interface (API) 113 to allow applications or services to contact CDP engine 110.

As production application 104 receives or transmits input/output operations, which is only one example of generating data, the input/output data is intercepted by data tap 112. In one embodiment, the input/output data is sent from production application 104 to CDP engine 110. In an alternative embodiment, data can first be sent to replication application 106 which relays the input/output data to data tap 112. CDP engine 110 records each input/output data transaction.

CDP engine 110 may include a write journal 111 as well as one or more volumes 115. The data stored in CDP engine 110 is initially written to write journal 111. As copies of the write journal are mirrored to primary storage 120, the mirrored data is stored in volumes 115 on CDP engine 110 and the write journal 111 maintains new I/O transactions from the time of the last mirroring operation.

CDP engine 110 includes an index 117 for recording metadata containing information about the contents of the CDP engine 110, including volumes 115 and write journal 111, and the location of corresponding volumes 121 at primary storage 120. The CDP engine 110 can be accessed to provide a point-in-time recovery of the production application 104 or of any other data being protected by the CDP engine 110 where the data is located in the write journal 111. In other words, the CDP engine can be used to restore a protected application 104 to the same state the application 104 was at any point in time in the past using the write journal 111. In contrast, many other replication or mirroring technologies may only allow a user to recover data at certain points in the past or the most recent copy. In one embodiment, CDP engine 110 is a Linux host, which acts as an array to provide continuous data protection.

The foregoing configuration allows for the mirroring of data in primary storage 120 and CDP engine 110. The replication application 106 controls the timing and movement of data from the CDP engine 110 to the primary storage 120. At certain predefined intervals, the data in the write journal 111 can be copied over to the primary storage 120 by first creating volumes 115 in CDP engine 110 and then copying over the volumes to primary storage 120, represented by volumes 121. For example, the volumes 121 may represent various protection sets of production application 104 data that are saved. Thereafter, the data represented by write journal 111 is written over (i.e., replaced) by new data written to CDP engine 110 from inputs/outputs of production application 104. The new data represented by write journal 111 is periodically copied over to primary storage 120 at predefined intervals, and, hence, the volumes 115 in CDP engine 110 will be updated with the new data as well. In one embodiment, an event marker can be placed in volumes 115 to indicate that a mirroring event has occurred.

The foregoing configuration provides both the ability to mirror data from the CDP engine 110 to the primary storage 120 and the ability to access point-in-time data at the CDP engine 110. This configuration provides multiple layers of redundancy to ensure that a reliable copy of data may be recovered in the case of disaster where data is lost or corrupted. If the primary storage 120 fails, the CDP engine 110 is able to restore the data saved in volumes 115 and write journal 111 to primary storage 120 at a particular point in time. Likewise, if the CDP engine 110 fails, the primary storage 120 is able to restore the data stored in volumes 121 back to the CDP engine 110.

Computer 102 includes a graphical user interface 122 that can be configured to display the contents of CDP engine 110 and/or primary storage 120 in an organized manner, such as by displaying volumes with a hierarchical structure. Graphical user interface 122 may also allow the user to configure CDP engine 110 to ensure that the CDP engine has sufficient storage allocated to protect a particular volume, directory, or application. The graphical user interface 122 can also be used to create pseudosnapshots and to select copies to be surfaced. Because the CDP engine 110 may store data on disk rather than on tape storage, the present invention allows files or entire volumes to be easily copied and saved back to the primary storage or to another location for performing other functions on the data such as backup/recovery, data mining or data consistency analysis.

FIG. 1 further illustrates an embodiment that allows pseudosnapshots and/or surfaced copies to be requested from a remote computer. For example, computer 102 can communicate with an analysis computer 150. Analysis computer 150 can request files or data from CDP engine 110 to be analyzed using, for example, data mining or data consistency techniques. This remote access of data can include requests to generate pseudosnapshots and/or requests to surface a copy based on a previously created pseudosnapshot.

In addition, FIG. 1 illustrates that data from the CDP engine 110 can be saved and recovered on a remote storage. Computer 102 can communicate with a server 152 to perform data backup/recovery functions. Thus, in one embodiment, the request for creating a pseudosnapshot or surfacing a copy can be generated by server 152 instead of client computer 102. It will be appreciated that the server 152 may have additional functionalities not available to the client computer 102. The server 152 may further be configured for controlling other backup operations. For example, the server 152 may control and direct all server-initiated backup operations or processes, while the computer 102 may control ad hoc backup and recover operations.

In FIG. 1, the server 152 has access to backup storage 154 where one or more copies of the client's data can be stored. The backup storage 154 can be located at the server 152 or may be distinct and separate from the server 152. The data 156 represents the data that has been backed up by the server 152 on the backup storage 154. The data 156 may include data recovered from the CDP engine in the form of a surfaced copy, or may also include other data, such as the data stored on computer 102, data from primary storage 120, or data from other sources.

The backup and recovery operations performed by the server 152 on the data of computer 102 are typically performed automatically in accordance with a schedule established by a user. However, as described above, users of the computer 102 may initiate backup operations directly from the computer 102. When the server 152 performs a backup of data in the CDP engine 110, in one embodiment, computer 102 can ensure that the appropriate protection sets associated with the backup operation are backed up while in an application consistent state. This may be performed by quiescing the applications included in the relevant protection sets prior to performing the backup operation, as previously described.

The server 152 may also store and manage a client file index 158 and a media volume 160 both on the server 152 itself and/or on the backup storage 154. The client-file index 158 is an index of the backed up data items. The media volume 160 is an index of the backup volumes. The client file index 158 and the media volume 160 are collectively referred to herein as the "online indexes". The online indexes are typically stored on the backup storage 154 after the backup operation is complete. However, it will be appreciated that other operating systems may use similar data structures for maintaining the directories and backed up items in order to restore the directories and items during recovery.

As previously mentioned, computer 102 can perform both the creation of a pseudosnapshot, and the surfacing of a copy. Once computer 102 has surfaced a copy, the data on the surfaced copy can be utilized similar to a traditional snapshot. For example, the data on the surfaced copy can be used to perform mirroring operations. The data on the surfaced copy can be used to perform a remote backup copy of the data. The remotely backed up data can then be used to recover data that has been lost during a disaster. Further, the data on the surfaced copy can be used for data analysis, such as data mining, data consistency checking, and the like. As also shown in FIG. 1, analysis computer 150 and server 152 may also communicate directly with SAN 108 or CDP engine 110 to obtain the surfaced copies.

As discussed below, while the present invention allows data to be backed up at various points in time, certain points in time can be earmarked as "application consistent" points in time where it is desirable that critical components of the operating system state be backed up and recovered as a consistent unit.

Figure 2:
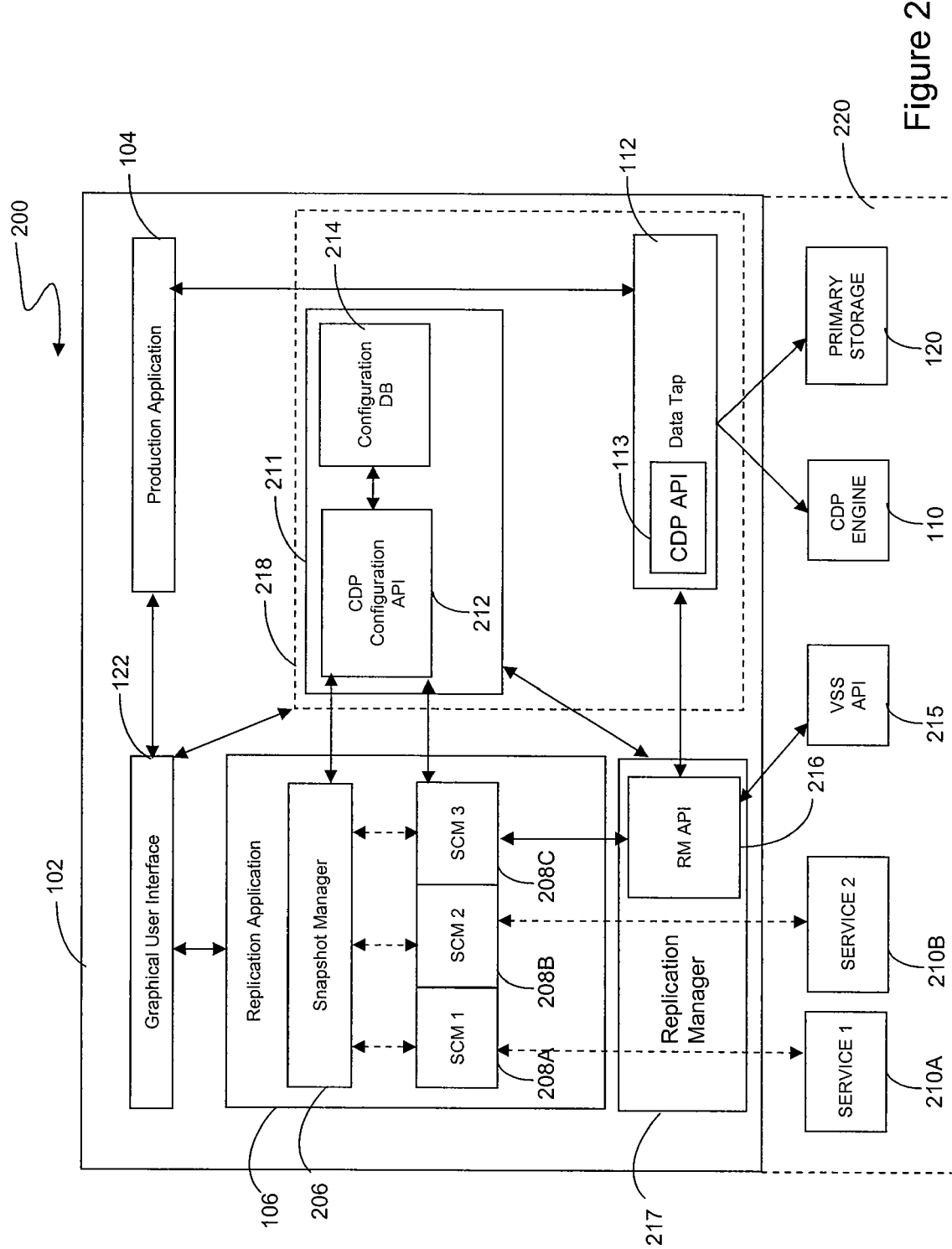
FIG. 2 illustrates an example of a system for performing replication operations using continuous data protection.

Exemplary Software Architecture for Performing Replication Operations on Continuous Data Protection Systems With reference to FIG. 2, another embodiment of a system or software architecture 200 is illustrated in detail, wherein like elements with regard to FIG. 1 will be referred to with the same reference numeral. System 200 illustrates an exemplary software architecture that can operate on computer 102 and/or other hardware components in further detail. Replication application 106 may further include a snapshot manager 206, which is a software component which may be configured to manage the creation of pseudosnapshots, control the scheduling of pseudosnapshot creation, and manage pseudosnapshot recoveries. The snapshot manager 206 may also include functions for converting the high-level task of generating a pseudosnapshot to application-specific tasks. Replication application 106 receives instructions to perform a replication function, sends a request to snapshot manager 206 to initiate generation of a pseudosnapshot, and manages all aspects of backup and recovery for computer 102.

Replication application 106 further includes one or more snapshot control managers (SCM) 208A, 208B, 208C that serve to facilitate communication between the snapshot manager 206 and various storage services that may operate on different platforms with which replication application 106 communicates. Various storage services 210A, 210B are illustrated that can operate in parallel with CDP engine 110. That is, CDP engine 110 is one example of a storage service 210. By way of example and not limitation, storage services 210A, 210B can be, but are not limited to, CLARiiON, Symmetrix, LSI, IBM, and other systems. The snapshot manager 206 will invoke the CDP engine 110 through the CDP SCM 208C. SCM 208C provides snapshot manager 206 with a common interface for performing replication operations while abstracting away storage architecture details, similar to the other SCM 208A, 208B. The snapshot manager 206 determines which storage service 210A, 210B, 110 is needed and makes calls to the appropriate SCM 208A, 208B, 208C.

Snapshot manager 206 may include various translation modules that have knowledge of specific applications, such as Exchange, SQL, Oracle, and SAP. The translation modules can communicate with the various production applications 104 to find out where the applications 104 are storing data so the snapshot manager 206 will know which SCM 208A, 208B, 208C to communicate with, in which drive or directory a file may be located, and the like.

Replication application 106 communicates with a replication manager 217 that is able to coordinate replication of data tasks, and does so across a number of technologies and client environments. Exemplarily, replication manager 217 includes various modules such as a session manager that coordinates and schedules various replication sessions, and other modules responsible for, but not limited to, discovering arrays and storage, initializing of a replica, creation of a replica, validation of a replica, restoration of a replica, and deletion of a replica. Scheduling includes a series of policies and preconfigured parameters that define the frequency at which pseudosnapshots are to be created, among other details.

Replication manager 217 can further manage indexing of pseudosnapshots in case the user needs to access them again, but does not have a tie-in to online or offline media, e.g., storage tapes. In one embodiment, the index of pseudosnapshots can be maintained at the replication application 106. Replication application 106 can communicate with offline media through a remote server 152 (see FIG. 1). Thus, replication application 106 can operate through replication manager 217 to perform replication functions. In addition to coordinating the scheduling of the tasks from the replication application 106, replication manager 217 can also act as a facilitator for a number of other tasks that require any sort of duplication of data.

Further, replication manager 217 coordinates various replication tasks that may occur on one or more of the storage services 210 simultaneously. For example, if storage services 210A and 210B are CLARiiON and Symmetrix storage systems, respectively, and production application 104 is a SQL and Exchange database, replication manager 217 assists in making copies of disks by communicating specifically to the storage services 210A, 210B. All of the replication tasks can be done using features that come with the storage service, but each storage service has its own command set, syntax, and idiosyncrasies. Replication manager 217 communicates with each storage service 210A, 210B so that the work of communicating with each storage service 210 is hidden from the user.

In one embodiment, replication manager 217 functions as a detached process from replication application 106 and snapshot manager 206. For example, replication manager 217 can operate as a daemon on Unix platforms or as a service on Windows operating environments. Replication manager 217 includes a replication manager API 216 to provide an interface for other utilities, e.g., CDP SCM 208C, among others, to access the replication manager 217.

System 200 also includes a data tap 112, which intercepts all of the changes to production application 104, and records the changes in the CDP engine 110, as described above. By continually recording each change to production application 104, the CDP engine 110 always has a current version of the production application 104 that may be accessed in the case of a disaster. The CDP engine 110 may also be configured to retain data in a manner that the production application 104 may be restored to any prior point-in-time status. Data tap 112 can include a CDP API 113 that the other utilities, e.g., replication manager 217, can use to communicate with the data tap 112.

As also shown in FIG. 2, computer 102 includes a configuration utility 211 that is initiated anytime CDP engine 110 is involved with any configuration function. The configuration utility 211 allows a user to create, modify, and delete protection sets, and control which volumes, drives, subdirectories, files, and the like will be included in a protection set to be protected by the CDP engine 110. In further detail, configuration utility 211 can be used to inform the CDP engine 110 which volumes are to be protected, and how to perform such protection operation. The configuration utility 211 will gather information from the user with regard to the CDP engine to be used, will create protection sets on the CDP engines, and will persist the resulting information in configuration database 214 to allow access by the CDP SCM 208C. Ultimately, the CDP SCM 208C uses the persisted protection set data saved during configuration when interacting with the replication manager 217 to create pseudosnapshots using the CDP technology. The CDP SCM 208C uses this configuration information to logon to the CDP engines via the replication manager 217.

The configuration utility 211 includes a CDP configuration API 212 and a configuration database 214. The CDP configuration API 212 allows access to the configuration database 214. The configuration data for accessing CDP engine 110 can be stored at a configuration database 214. Configuration database 214 may also store authentication credentials for communicating with the CDP engine 110, identification information for attached CDP engines 110, details regarding protection sets that have been stored on the CDP engine 110, and the like.

The CDP initialization performed by configuration utility 211 is usually performed the first time a user desires to store data from computer 102 or primary storage 120 to CDP engine 110. Thereafter, anytime replication application 106 wants to interact with CDP engine 110 (e.g., replication application 106 wants to work off of a copy of data held at CDP engine 110), replication application 106 will use configuration utility 211 to communicate with the CDP SCM 208C. The configuration utility 211 will confirm that the requested data is held at or capable of being held at CDP engine 110 and any other information needed to access or store data at the CDP engine 110.

In order to prevent unauthorized access to the CDP engine, the CDP configuration utility 211 maintains the authentication credentials required to communicate with the CDP engine 110, such as, but not limited to, a username and password. Essentially, the configuration utility 211 allows an administrator to initiate communication between the computer 102 and the CDP engine 110. A user or utility must provide the appropriate authentication credentials prior to writing to or reading from the CDP engine 110. Although FIG. 2 includes a single CDP engine 110, the system 200 may include two or more CDP engines, each of which can be protected by unique authentication credentials. After configuring the CDP configuration utility 211, the configuration data for accessing CDP engine 110 can be stored at configuration database 214.

Finally, computer 102 may be configured such that the above benefits may be implemented in an existing system having a replication application 106 that is preconfigured for the creation and recovery of traditional snapshots. For example, as shown in FIG. 2, replication manager API 216 may communicate with a VSS shadow copy service via a VSS API 215. VSS shadow copy service is one conventional method for creating snapshots on the Windows operating systems.

In one embodiment, replication application 106, replication manager 217, configuration utility 211 and data tap 112 can be configured as a single software application. In another embodiment, replication application 106, and replication manager 217 can be obtained from existing products, with an SCM 208C added to allow communication with CDP engine 110, while configuration utility 211 and data tap 112 can be configured as a separate marketed piece as indicated by the dashed line 218. This embodiment may be preferable where a computer already has a replication application that is preconfigured for snapshot backup and recovery, but it would be desirable for the computer to have the additional benefits of CDP, but without the expense of overhauling their entire snapshot replication application.

In yet another embodiment, the functions of replication application 106 and replication manager 217 may also be combined into a single software utility, if desired. In one embodiment, the configuration utility 211 illustrated in FIG. 2 is separate from replication application 106. However, in other embodiments, the configuration utility 211 could be part of or integrated with replication application 106. Finally, components shown external of computer 102 could be formed as an integral unit with computer 102 as indicated by dashed line 220.

Exemplary Method for Storing Protection Sets on a CDP Engine

Figure 3:
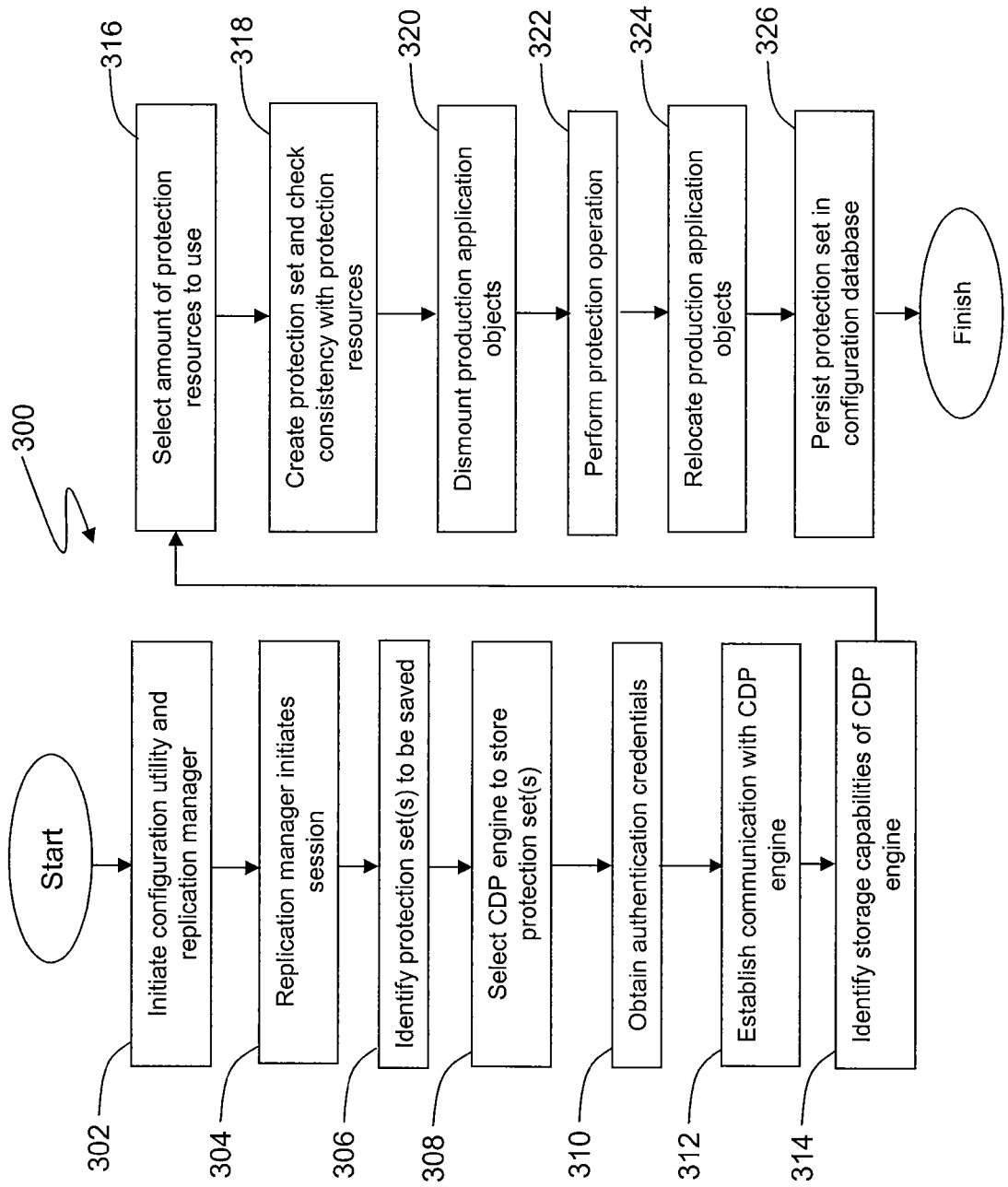
FIG. 3 illustrates an example of a method for storing protection sets on a continuous data protection engine.

Exemplary processes using the above exemplary architecture will now be described. Initially, CDP engine 110 must be first populated with data. An exemplary method 300 for storing an initial protection set on CDP engine is illustrated in FIG. 3. A protection set is a set of one or more data volumes to be protected using CDP technology. It will be appreciated that some of the stages of method 300 can be modified, performed in a different order, eliminated, and that additional stages may be added. Exemplarily, the stages of method 300 can be performed using the systems 100 and 200 depicted in FIGS. 1 and 2, realizing that other systems may be used to perform the stages thereof.

At 302, the configuration utility 211 is initiated and, as an initial matter, needs to establish communication with the replication manager 217. This can include the configuration utility 211 obtaining the replication manager 217 service port and sending the service port to the configuration database 214. The replication manager 217 service port can be obtained from different storage areas depending on the operating system. For example, in Windows operating systems, the replication manager 217 service port can be persisted on the registry. For UNIX systems, the replication manager 217 service port may be persisted in a persistent store identifiable by the configuration utility 211. Once the configuration database 214 has the service port for the replication manager 217, it does not need to obtain it again.

At 304, replication manager 217 initiates a session. In general, the replication manager 217 may be responsible for managing various operations such as, but not limited to, performing a protection operation on a protection set, generating a pseudosnapshot, and the like. For each operation, a session manager module on replication manager 217 tracks the session. A session is initiated by, for example, the configuration utility 211 making an API call (e.g., using replication manager API 216) to the replication manager 217 to start a session, which initiates a session manager at the replication manager 217. Replication manager 217 returns a session handle to the initiating utility, such as configuration utility 211.

At 306, the user selects the protection sets to save. In one embodiment, protection sets can be part of or an entire volume. Configuration utility 211 discovers volumes from, for example, the operating system volume enumeration service. For example, the configuration utility 211 can make API calls to the operating system. Alternatively, replication manager 217 may have an API to discover volumes attached to the computer 102. For example, one or more volumes may be from the primary storage 120 connected to the computer 102. This may be the case where primary storage has been the primary repository for storage for a production application and it is desired to add a CDP engine in order to provide mirroring capabilities. The available volumes are displayed on the graphical user interface 122 and the user can select which volumes or files to include in a protection set to be used to populate CDP engine 110.

At 308, the user selects one or more CDP engines on which to store the protection set. This can include the configuration utility 211 making an API call (using replication manager API 216) to the replication manager 217 which initiates a module for discovering storage. The discover storage sends a query through the data tap 112 by making an API call (using CDP API 113). The data tap 112 then sends the query to any CDP engines 110 to which the data tap 112 is connected. The data tap 112 returns the identification of any CDP engines 110 to which it is connected to the replication manager 217. The configuration utility 211 can then request the results from the replication manager 217 which returns the identified CDP engine(s) 110. The identified CDP engines are then displayed on the graphical user interface 122 and can be selected by the user for storing protection sets desired to be protected.

Note that communication between configuration utility 211, replication manager 217, data tap 112, and CDP engine 110 can follow a similar path of 302, 304, 306 and 308 using replication manager API 217 and CDP API 113. In a session, generally, API calls include a session handle or session identifier, along with the requested information.

At 310, authentication credentials are obtained and encrypted. The user enters authentication credentials through graphical user interface 122 using authentication methods such as, but not limited to, a username and password. The configuration utility 211 sends the authentication credentials to the replication manager 217, which encrypts the authentication credentials and sends the encrypted credentials to the configuration utility 211 to be stored in configuration database 214.

At 312, with the encrypted authentication credentials, the configuration utility 211 then proceeds to establish communication with the selected CDP engine 110. Configuration utility 211 makes a logon request to the replication manager 217, which then establishes a connection with the CDP engine 110.

At 314, the configuration utility 211 discovers the storage capabilities of the CDP engine 110. This can include configuration utility 211 sending a discover target storage command to the replication manager 217 which initiates a discover target storage module. The discover target storage module sends a request to the CDP engine 110 to discover its storage capabilities. Once the authentication credentials are encrypted at 310, all necessary communication with the CDP engine 110 is securely encrypted and does not have to be done again until a session is completed. Querying the CDP engine 110 for its storage capacity can include the CDP engine 110 sending back the identity and state of available storage medium, e.g., volume storage 115. Details relating to the storage capabilities or protection resources that are available on the CDP engine 110 can be displayed on the graphical user interface 122.

At 316, the user is able to select through the graphical user interface 122 the amount of protection resources to use, which can be measured against the amount of protection resources available. Such protection resources can include, but are not limited to, the number of days of storage available, the estimated change rate, and the amount of available storage. For example, a user can select particular storage mediums on CDP engine 110 the user wishes to use for protection storage.

At 318, computer 102 creates a protection set for specified production volumes. This can include initiating an initialize replication module in the replication manager 217. The initialize replication module can compare the protection set items with the identified storage medium at CDP engine 110 to compare the amount of storage needed versus storage available to ensure that they are consistent. After checking consistency, the CDP engine 110 can return a device map that can be persisted in the configuration database 214 that can exemplarily show where in the CDP engine 110 the protection set is stored.

At 320, configuration utility 211 dismounts production application objects prior to starting protection of the selected protection set items. Dismounting the production application objects makes them unavailable to the user or to other applications to prevent data in the protection set from being changed while the protection set is being copied to the CDP engine 110. Prior to or during the dismounting of the production application object, the configuration utility 211 or replication application 106 places the production application 104 in a quiescent state.

At 322, the configuration utility 211 signals the initialize replica module in the replication manager 217 to instruct the CDP engine 110 to start the protection operation. During the protection operation, the CDP engine 110 makes a full copy of the protection set items onto CDP engine 110. The CDP engine 110 may provide protection progress updates to configuration utility 211. When the CDP engine 110 completes the protection operation, it sends an operation complete signal to the configuration utility 211.

At 324, the configuration utility 211 may relocate production application objects. Relocating the production application objects essentially renames the application volume. The new name should be used thereafter in order for the application object to be protected using CDP technology. At 326, configuration utility 211 persists a protection set on the configuration database 214.

Exemplary Method for Creating a Pseudosnapshot

Figure 4:
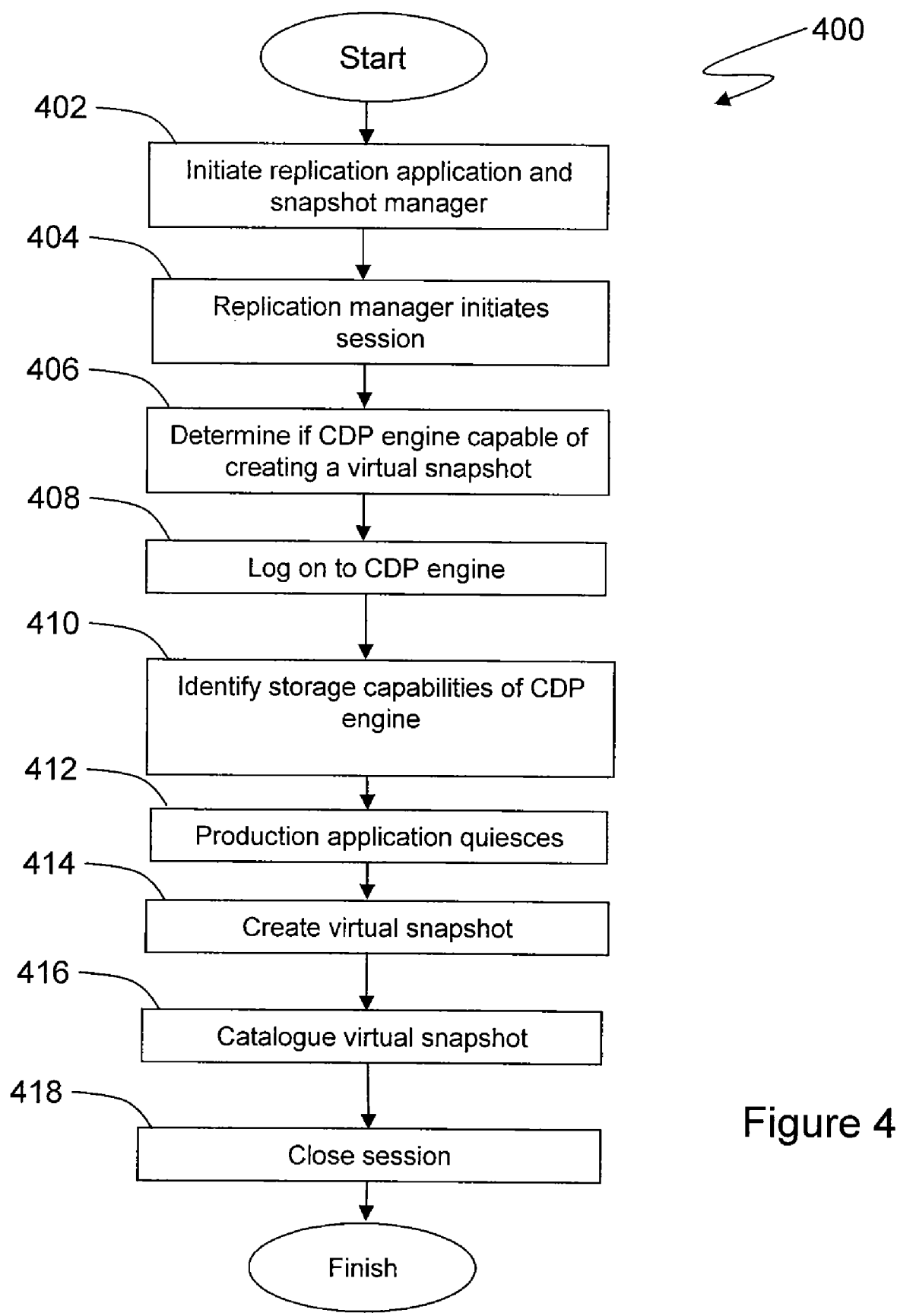
FIG. 4 illustrates an example of a method for generating a pseudosnapshot on a continuous data protection engine.

FIG. 4 illustrates an exemplary method 400 for creating a pseudosnapshot. It will be appreciated that some of the stages of method 400 can be modified, performed in a different order, eliminated, and that additional stages may be added. Exemplarily, the stages of method 400 can be performed using the systems 100 and 200 depicted in FIGS. 1 and 2, realizing that other systems may be used to perform the stages thereof.

At 402, the replication application 106 receives a request to create a pseudosnapshot. The request can be made as part of a regularly scheduled creation of pseudosnapshots. Alternatively, a request to create a pseudosnapshot can be made on an ad hoc basis. Replication application 106 recognizes the request to access the CDP engine 110 and initializes the snapshot manager 206 and SCM 208C.

At 404, SCM 208C makes an API call using replication manager API 216 to replication manager 217 to establish a session using the session manager module. When the session is established, the SCM 208C loads and validates the format of the configuration database 214.

At 406, the snapshot manager 206 determines whether the CDP engine 110 is capable of creating a snapshot, i.e., whether the CDP engine 110 contains the data required to generate a snapshot. To ascertain this, the SCM 208C can simply query configuration database 214 to determine if the appropriate data is present (the appropriate data may have previously been stored as a structured text file readable by the user, but also known by the configuration utility in configuration database 214 during a protection set storage operation, described in method 300).

At 408, the SCM 208C logs onto the CDP engine 110. This can include the SCM 208C obtaining the CDP engine credentials from the configuration database 214 to log onto the CDP engine 110.

At 410, the CDP engine 110 reports of available data on which to create a pseudosnapshot. This can include SCM 208C requesting replication manager 217 to query the protection set at the CDP engine 110. Replication manager 217 may use a storage discovery module to query the CDP engine 110 for a protection set. The CDP engine 110 returns the CDP group object to the replication manager 217.

At 412, in one embodiment, replication application 106 sends an instruction to production application 104, requesting the application to temporarily quiesce (i.e., temporary enter an inactive state). By way of example, upon receiving the instruction to quiesce, the production application 104 may complete any operations that must be completed to achieve consistency, and/or may flush its buffers and memory to a temporary storage location. In one embodiment, production application 104 will send a notification to replication application 106 or snapshot manager 206 upon entering a quiescent state.

At 414, CDP engine 110 creates a pseudosnapshot. This can include snapshot manager 206 sending an instruction to replication manager 217 which initiates a create replica module. The instructions may include a data structure that describes the protection set against which an event market should be created. (This data structure can also be persisted in the configuration database 214.) The event marker is a data structure that may exemplarily contain information regarding the time at which the pseudosnapshot was created (i.e., the time at which the last change was made to the CDP engine 110 prior to the placement of the event marker). Replication manager 217 sends the instruction to CDP engine 110 to create an event marker at the appropriate point in time. The event marker may also be generated by the replication manager 217, CDP engine 110, snapshot generator 206, or the SCM 208C. The event marker may be stored at computer 102, CDP engine 110, or primary storage 120, as well as at a remote location, such as server 152.

The CDP engine 110 returns the results (i.e., operation successfully completed or operation failed) to the replication manager 217, which is forwarded to the snapshot manager 206. The snapshot is "pseudo" because while the pseudosnapshot data may appear to have the properties of conventional read-only snapshot from the perspective of the snapshot manager 206, when a pseudosnapshot is created, no snapshot is actually created on any storage disk. Instead, an event marker is created at the time the pseudosnapshot is created to allow a copy of the data to be surfaced from the CDP engine 110 up until the point in time at which the event marker was created. If desired, the surfaced copy can be formatted to have the properties of a conventional read-only snapshot. CDP engine 110 may also send a pseudosnapshot handle to replication manager 217 including an identifier of the CDP engine on which the relevant data is stored, an identifier for the protection set that is being protected, and an event marker.

At 416, the replication application 106 may catalogue the created pseudosnapshot in an index in the same manner as would be done for creation of a conventional snapshot so that replication application 106 has record of the pseudosnapshots that can be accessed at a later point in time. For example, the index of the pseudosnapshots may be stored at the backup/recovery server 152.

At 418, after the event marker has been created, replication manager 217 may send a command to configuration utility 211 and/or the replication application 106 to close the pseudosnapshot session so that the computer 102 may resume its normal operation.

As snapshot manager 206 requests more pseudosnapshots, CDP engine 110 generates more event markers, thus resulting in an entire collection of pseudosnapshots. The event marker provides the system and user with information regarding the time at which the pseudosnapshot was created. Therefore, a user viewing the data on graphical user interface 122 may perceive a large number of potential copies that can be surfaced. However, in reality the CDP engine 110 is simply storing a series of event markers, but is able to surface the data to reflect a copy of data for each pseudosnapshot. As will be described further below, the data in CDP engine 110 can thus be viewed at points in time by selecting one of these event markers, and requesting a surfacing of a copy up until the point in time of the event marker, which surfaced copy can be displayed and selected using graphical user interface 122.

Graphical user interface 122 allows the user to manage all the event markers. Because the collection of event markers may grow quite large, graphical user interface 122 allows the user to view the event markers in an organized manner and select them quickly and efficiently. As discussed above, when the graphical user interface 122 displays the event markers (i.e., pseudosnapshots) to the user, the data may be organized into volumes, directories, and files, in order to correspond to the organization contained in CDP engine 110. In one embodiment, a catalogue of event markers can also be stored on server 152 in a media database and used for recovery purposes. Further, the graphical user interface 122 also allows the user to establish a schedule for defining the times at which the pseudosnapshots of selected protection sets will be created. However, users on the clients can also initiate ad hoc creation of pseudosnapshots. Scheduling may include establishing a series of policies and preconfigured parameters that define the frequency at which pseudosnapshots are to be created, among other details. The graphical user interface 122 may communicate the information received from the user to replication application 106, the configuration utility 212, or replication manager 217 as necessary.

The frequency at which a user may schedule the creation of pseudosnapshots may vary widely, depending on the needs of a system and application being protected. For example, an application that undergoes few changes may only require the creation of a pseudosnapshot every fifteen minutes to an hour. Conversely, a user may schedule the creation of a pseudosnapshot every minute or less where the application being protected is constantly changing critical data. Furthermore, because pseudosnapshots require only a minimal amount of memory in addition to the memory already required by the CDP engine, the number of pseudosnapshots that can be indexed is only limited by the size of the CDP engine. Therefore, millions of pseudosnapshot can potentially be stored, as opposed to a traditional snapshot system, which normally could only hold a few snapshots.

Where pseudosnapshots correspond to quiesced states, the only limitation on how often a pseudosnapshot is created is the quiesce time of the application being protected. Because pseudosnapshots can be created in the time it takes the application to quiesce, pseudosnapshots can be created much more often than actual snapshots can typically be created in a traditional snapshot system. As quiescing time becomes shorter and shorter, pseudosnapshots can potentially have the same fine level of granularity that is provided by CDP systems.

Figure 5:
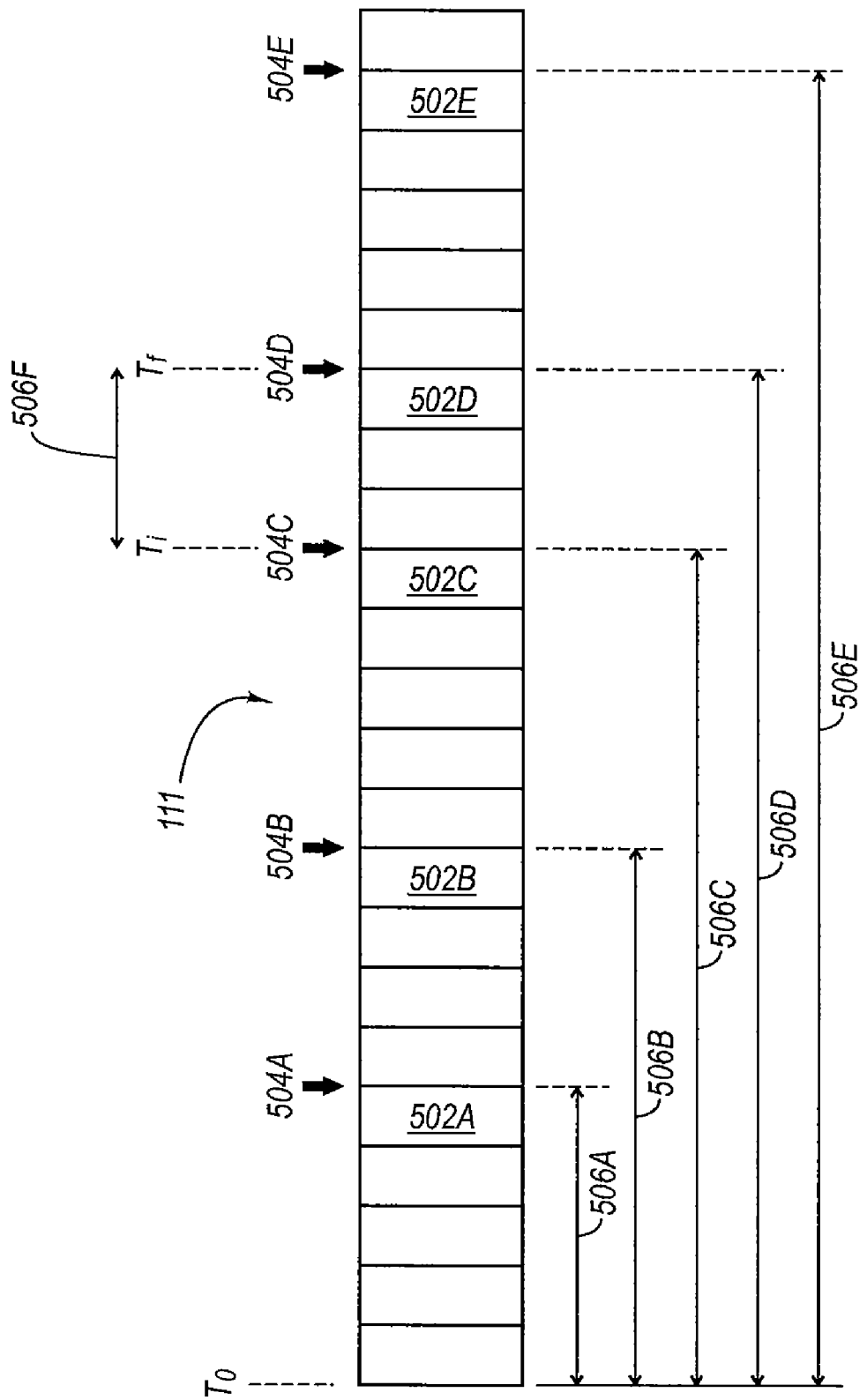
FIG. 5 is a depiction of pseudosnapshots and surfaced copies, in accordance with the present invention.

FIG. 5 is provided as one simplified depiction of the relationship between the data stored within, for example, the write journal 111 of the CDP engine 110 and the event markers that signify the existence of a pseudosnapshot. FIG. 5 includes a depiction of a write journal 111, including a plurality of transactions, identified by boxes. The transactions of write journal 111 (which can be inputs and outputs sent to and from production application 104) are chronological and so a $T_0$ indicates the starting time of the write journal. Therefore, as time progresses, the boxes of write journal 111 are filled with new data from production application 104 from left to right. As stated above, the present invention is simplified and the actual storage of data and the addressing scheme within the write journal 111 may be much more complex than shown in FIG. 5.

After certain transactions have been recorded in the write journal 111, an event marker may be created. FIG. 5 depicts the creation of five pseudosnapshots (i.e., after transactions 502A, 502B, 502C, 502D, and 502E) during the time write journal 111 is generated. Each time a command is received that a snapshot be created, an event marker is generated, as described above. The arrows labeled 504A, 504B, 504C, 504D, and 504E represent event markers which are "placed" at the point-in-time when the pseudosnapshot is created. Although the term "placed" is used in order to assist in the visualization of event markers, the actual event markers do not have to be stored with the data in the write journal 111. Instead, the event markers may merely include the time and date at which the pseudosnapshot is created, thus identifying the last entry within the write journal 111 before the snapshot was created. Therefore, event marker 504A identifies the transaction 502A, event marker 504B identifies the transaction 502B, event marker 504C identifies the transaction 502C, event marker 504D identifies the transaction 502D, and event marker 504E identifies the transaction 502E. Alternatively, the first entry immediately after an event marker is created could also be used to identify the existence of a pseudosnapshot. In this manner, a large number of pseudosnapshots may be generated and stored while minimizing the amount of storage necessary to accommodate the pseudosnapshots.

Exemplary Methods for Surfacing a Copy Using a Pseudosnapshot

Once the pseudosnapshots have been created using the techniques described above, a user has the option of surfacing a copy which contains an image of any of the data actually corresponding to a pseudosnapshot. The process of surfacing a copy includes the selection of a pseudosnapshot. For example, in one embodiment, a user may enter a time in the past up until which the user wishes to surface a copy.

After the user selects a pseudosnapshot, SCM 208C then surfaces a copy by reading the data stored in the CDP engine up until the point in time that the event marker corresponding to the selected pseudosnapshot was created. SCM 208C formats this data into a data structure that has the appearance of a traditional snapshot from the perspective of snapshot manager 206 and replication application 106.

Figure 6:
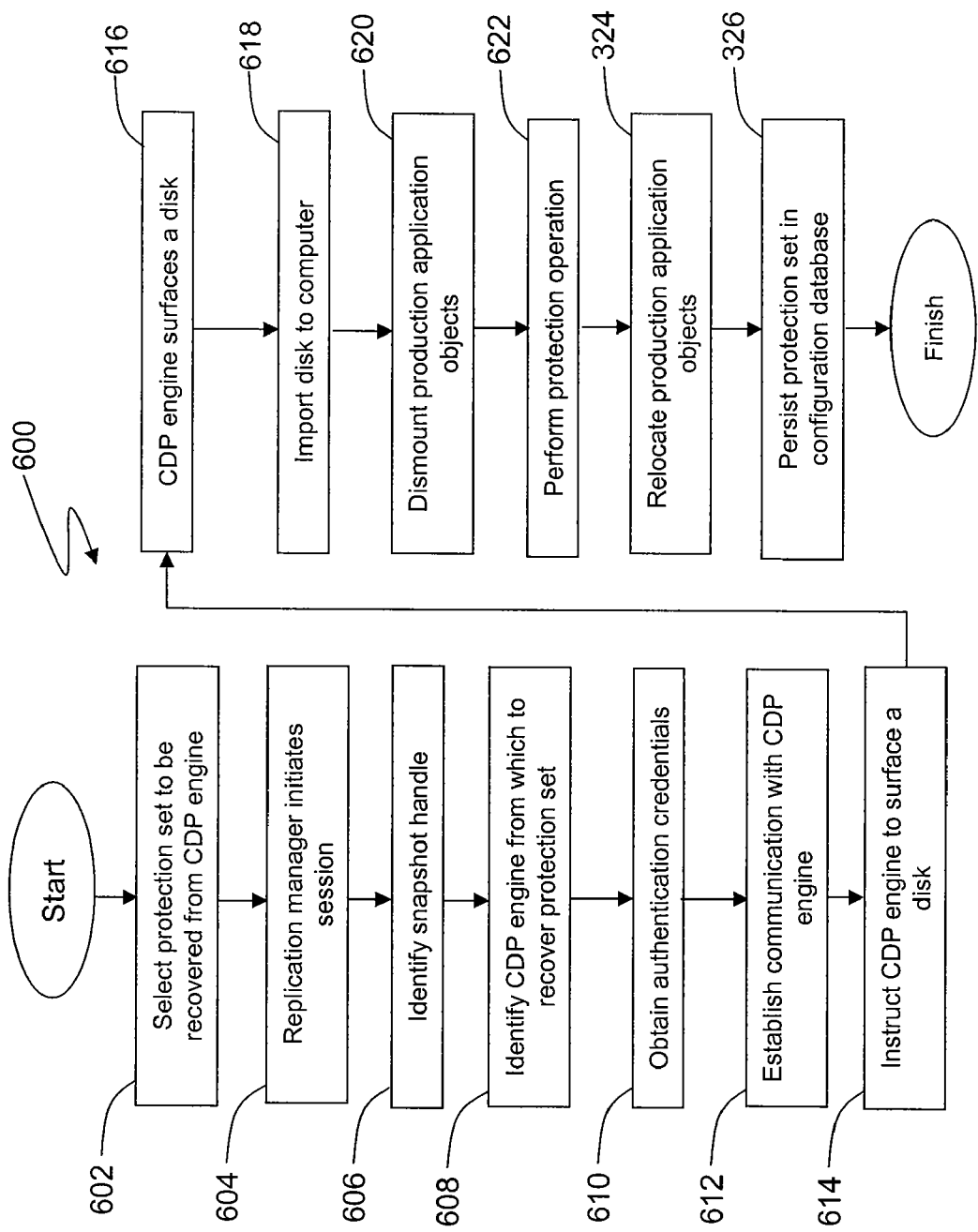
FIG. 6 illustrates an example of a method for surfacing a copy from a continuous data protection engine to provide a replication operation.

FIG. 6 illustrates an exemplary method 600 for surfacing a copy from CDP engine 110. It will be appreciated that some of the stages of method 600 can be modified, performed in a different order, eliminated, and that additional stages may be added. Exemplarily, the stages of method 600 can be performed using the systems 100 and 200 depicted in FIGS. 1 and 2, realizing that other systems may be used to perform the stages thereof.

Periodically, the replication application 106 inventories the available pseudosnapshots. This can occur, for example, when replication application 106 requests a recovery operation. An index containing a list of available pseudosnapshots can be located on computer 102, the backup/recovery server 152, or other location. Alternatively, replication application 106 may query CDP engine 110 or a remote server 152 that may contain an index of pseudosnapshots for CDP engine 110.

At 602, a user selects a protection set that should be recovered from CDP engine 110. The protection set may include any data from production application 104, and data from any other application, volume, disk, or the like, that has been backed up on CDP engine 110. The protection set may be manually selected by the user, or automatically selected in light of properties that correspond to a pseudosnapshot selected for recovery by the user.

At 604, replication application 106 initializes a session. As discussed above, this can include the SCM 208C initiation a session manager module on replication manager 217. Afterwhich, the SCM 208C loads and validates the format of the configuration database 214. At 606, snapshot manager 206 generates a snapshot handle including, but not limited to, the CDP engine 110 name, the protection set name, and an event marker name. As discussed above, the snapshot handle can be stored at configuration database 214.

At 608, the snapshot manager 206 identifies which CDP engine 110 contains the protection set to be recovered. At 610, snapshot manager 206 obtains authentication credentials from configuration database 214. At 612, SCM 208C logs onto the CDP engine 110 using authentication credential obtained through the configuration database 214. The logon instruction is sent through the replication manager 217 to CDP engine 110.

At 614, SCM 208C sends a request to CDP engine 110 to surface a copy. This can initiate a surface replica module on replication manager 217. The surface replica module sends an instruction to CDP engine 110 to mount a surfaced copy of the data corresponding to the pseudosnapshot being recovered. At 616, the CDP engine 110 surfaces a copy by reading the data stored on CDP engine up until the event marker representing the pseudosnapshot.

After the copy is surfaced, computer 102 can use the surfaced copy to perform various replication operations. In one embodiment, at 618, SCM 208C sends a request to import the surfaced copy from the CDP engine 110. This can include initiating a storage discovery module in replication module 217. At 620, the user makes a selection as to the host onto which the surfaced copy will be imported. For example, a surfaced copy may be imported into primary storage 120, hardware 210A and 210B, computer 102, or other onsite or offsite locations. Alternatively, the surfaced copy may be copied into another host. At 622, assuming that the user has selected the primary storage 120 on which to import or copy the surfaced copy, replication application 106 performs a restoration operation on the primary storage 120. That is, the surfaced copy is imported from CDP engine 110 to primary storage 120.

At 624, SCM 208C sends a request to CDP engine 110 to submerge the surfaced copy. This can include initiating a submerge replica module on replication manager 217. The submerge replica module sends an instruction to CDP engine 110 to dismount the surfaced copy. At 626, snapshot manager 206 closes the session between replication manager 217 and configuration utility 211.

The management of the copy surfacing or recovery process may be accomplished via graphical user interface 122. The graphical user interface 122 may provide the user with a visual depiction of all available pseudosnapshots that may be recovered via surfacing a copy. The interface between the CDP engine 110, replication application 106, and graphical user interface 122 may create the appearance on the graphical user interface 122 of a plurality of traditional snapshots that may be selected for recovery by the user. In other words, the mechanics of creating a pseudosnapshot can be transparent to the user and the user may view the pseudosnapshots the same as other traditional snapshots. As described above, when a user selects a pseudosnapshot to be recovered, the replication application 106 translates this request into a surfaced copy containing the appropriate data from the CDP engine 110.

A copy may be surfaced for a variety of reasons. For instance, if the data for production application 104 has recently been corrupted on primary storage 120, the user can select a pseudosnapshot that was created prior to the time at which production application 104 was corrupted. A copy can be surfaced up until that point and recopied to the primary storage 120 to replace the lost data. In another example, a user may want to create an additional copy of the surfaced copy for data security purposes. The copy of the surfaced copy may be saved to a separate disk, tape, or the like, including storage at repositories 115, primary storage 120, and backup storage, as will be further described below. The additional copy may be sent to an offsite location in preparation for an onsite disaster such as a flood, fire, theft, etc. Another common reason to surface a copy is to recover a prior version of production application 104 following a disaster causing corruption or loss of data on the production application 104. In this case, the surfaced copy may be loaded onto computer 102 to serve as a recovery for the corrupted application.

Turning back to FIG. 5, when surfacing the copy related to a particular pseudosnapshot, the surfaced copy can include the data included within the write journal 111 from $T_0$ up to a particular event marker. Therefore, surfaced copy 1 consists of all data included in the write journal as indicated by the arrow 506A, surfaced copy 2 consists of all data included in the write journal as indicated by the arrow 506B, surfaced copy 3 consists of all data included in the write journal as indicated by the arrow 506C, surfaced copy 4 consists of all data included in the write journal as indicated by the arrow 506D, and surfaced copy 5 consists of all data included in the write journal as indicated by the arrow 506E.

In an alternative embodiment, instead of surfacing, for example, all of write journal 111, CDP engine 110 may be able to surface only incremental changes. In this embodiment, the replication application 106 may request a browse tree from CDP engine 110 that displays the various event markers. A user can select from the browse tree a range of time in which incremental changes are desired. Thus, the process of surfacing a copy of incremental changes can be similar to surfacing an entire copy from $T_0$, except instead of surfacing a copy from $T_0$ an event marker, the data that is surface is from $T_i$ to $T_f$ as selected by a user. For example, as shown in FIG. 5, an incremental backup can be formed using data up to event marker 504D at $T_f$ less that data up to event marker $T_i$, the surfaced changes constituting pseudosnapshot 506F. In other embodiments, a user can select $T_i$ to $T_f$ to be any other point in time that is not indicated with an event marker.

As mentioned previously, many of the advantages that have traditionally been unique to either CDP technology or snapshot technology are combined into a single system in accordance with the present invention. For example, the present invention benefits from CDP's very fine level of granularity, because pseudosnapshots can potentially be created at the same frequency that data tap 214 sends changes in production application 104 to CDP engine 110.

Another advantage of the present CDP-snapshot combination allows for recovery of data in an "application consistent state." When an application is backed up at a point in time when the entire application is in a consistent state, the backup is said to be in an "application consistent state." One technique used to obtain an application consistent state is to quiesce the application prior to a backup operation, as described previously. On the other hand, when a backup is created without quiescing the application, it is likely that the backup occurred when the entire application was not in a consistent state. When an application is backed up at a point in time when the application is not in a consistent state, the backup is said to be in a "crash consistent state", i.e., in the same state it would have been had the system crashed and recovered (e.g., a loss of power) at the time of the backup operation.

Because of the continuous nature of CDP backup operations, data that had been saved to the CDP engine are often saved only in a crash consistent state. In a typical CDP environment, the CDP makes continuous backups of an application's reads and writes, but is not cognizant of the needs of the actual application. For example, perhaps a disaster occurred while an application was in the process of performing a complex operation. By recovering the most recent data stored in the CDP engine, the result will be the recovery of that same application as last saved midway through the complex operation. Thus, the recovered application is merely in a crash-consistent state. As systems grow more complex, the problems associated with crash-consistent backups on the CDP engine escalate. By combining CDP with snapshot technology, a user can easily select data from the CDP engine that was saved while the application was in an application consistent state.

Embodiments included dedicated devices or systems that include both hardware and/or software components. Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Those skilled in the art will appreciate that the invention may be practiced with other computer system configurations, including hand-held devices, multi-processor systems, microprocessor-based or programmable customer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for surfacing a copy of data stored in a continuous data protection system, the copy of data used in performing replication operations, the system comprising:
    a data tap configured to intercept a series of transactions of a production application and to communicate each of the series of transactions to the continuous data protection system;
    the continuous data protection system including a computer and a processor, the continuous data protection system configured to save the series of transactions of the production application, the continuous data protection system configured to allow a point in time view of the series of transactions; and
    a replication application communicating with the continuous data protection system, the replication application configured to:
        initiate generation of at least one pseudosnapshot of the series of transactions saved on the continuous data protection system;
        create at least one event marker that identifies a point in time in the series of transactions in a write journal, each pseudosnapshot associated with at least one event marker, wherein at least one of the at least one pseudosnapshot corresponds to a quiescent state for at least a portion of the series of transactions in the write journal;
        present the at least one pseudosnapshot to a user using the at least one event marker, wherein each of the at least one pseudosnapshot is viewed by the user as a snapshot in a graphical user interface, wherein a particular pseudosnapshot is selected for surfacing and wherein the particular pseudosnapshot identifies a dataset that can be reliably surfaced; and
        initiate surfacing of a copy of the at least a portion of the series of transactions that were saved before the generation of the selected pseudosnapshot.

2. The system as recited in claim 1, wherein the replication application is located separately from the continuous data protection system.

3. The system as recited in claim 1, wherein the replication application causes the production application to quiesce during the generation of the at least one pseudosnapshot.

4. The system as recited in claim 1, wherein the continuous data protection system is comprised of:
    a write journal configured to save the series of transactions; and
    at least one volume configured to save a second copy of the surfaced copy.

5. The system as recited in claim 4, wherein the write journal is configured to save the series of transactions from a point in time in which a previous surfaced copy was generated.

6. The system as recited in claim 1, wherein the at least one event marker identifies the point in time after one of the transactions in the series of transactions is saved on the continuous data protection system.

7. The system as recited in claim 6, wherein the at least one event marker is stored in at least one of:
    the continuous data protection system; or
    the replication application.

8. The system as recited in claim in 1, further comprising a graphical user interface communicating with at least one of the continuous data protection system or the replication application, the graphical user interface configured to display the at least one pseudosnapshot and allow the user to select the particular pseudosnapshot for surfacing the copy of at least a portion of the series of transactions.

9. In a system for performing replication operations using a continuous data protection system, the continuous data protection system configured to save a series of transactions of a production application, a method for surfacing a copy of data to be used in performing replication operations, the method comprising:
    saving a series of transactions of a production application on a continuous data protection system;
    generating a plurality of pseudosnapshots from the series of transactions;
    creating at least one event marker, wherein each event marker identifies a point in time in the series of transactions of the production application, each pseudosnapshot associated with at least one event marker;
    presenting the plurality of pseudosnapshots to a user in a graphical user interface, wherein the plurality of pseudosnapshots correspond to a particular period of time and wherein the plurality of pseudosnapshots appear to the user as traditional snapshots;
    identifying a pseudosnapshot from the plurality of pseudosnapshots, the pseudosnapshot relating to a point in time in the series of transactions stored on the continuous data protection system, wherein the pseudosnapshot corresponds to a quiescent state of the series of transactions, wherein the identified pseudosnapshot is associated with an event marker included in the at least one event marker, the event marker identifying a particular point in time after one of the transactions in the series of transactions is saved on the continuous data protection system;
    surfacing a copy of at least a portion of the series of transactions saved before the point in time to which the pseudosnapshot relates; and
    presenting the surfaced copy such that the surfaced copy can be read in a subsequent replication operation.

10. The method as recited in claim 9, further comprising receiving a selection from the user through the graphical user interface identifying the pseudosnapshot.

11. The method as recited in claim 9, further comprising receiving a selection from the user through the graphical user interface identifying a destination for sending the copy of the transactions.

12. The method as recited in claim 9, further comprising sending the surfaced copy to a destination remote from the continuous data protection system.

13. The method as recited in claim 9, wherein the continuous data protection system is configured to save the series of transactions from a point in time in which a previous surfacing of a copy of transactions occurred.

14. The method as recited in claim 9, wherein surfacing a copy of at least a portion of the series of transactions saved before the point in time to which the pseudosnapshot relates further comprises copying all of the transactions in the series of transactions.

15. A method for surfacing a copy of data in a continuous data protection system, the method comprising:
- saving a series of transactions of a production application in the continuous data protection system;
- generating a plurality of pseudosnapshots from the series of transactions;
- creating at least one event marker, wherein each event marker identifies a point in time in the series of transactions of the production application, each pseudosnapshot associated with at least one event marker;
- presenting at least some of the plurality of pseudosnapshots to a user, wherein the plurality of pseudosnapshots appear to the user in a graphical user interface as snapshots and have been identified from a plurality of event markers that were previously created;
- identifying a pseudosnapshot from the plurality of pseudosnapshots, the identified pseudosnapshot comprising at least a portion of a series of transactions on the continuous data protection system, wherein the pseudosnapshot is in a quiescent state;
- identifying an initial transaction at the beginning of the pseudosnapshot;
- identifying a last transaction at the end of the pseudosnapshot;
- copying the transactions from the initial transaction of the pseudosnapshot to the last transaction of the pseudosnapshot; and
- presenting the copy of the transactions such that the copy can be read in a subsequent replication operation.

16. The method as recited in claim 15, further comprising receiving a selection from a user through a graphical user interface identifying the pseudosnapshot.

17. The method as recited in claim 15, further comprising receiving a selection from a user through a graphical user interface identifying a destination for sending the copy of the transactions.

18. The method as recited in claim 15, wherein identifying a last transaction at the end of the pseudosnapshot comprises identifying an event marker identifying a particular point in time after the last transaction is saved on the continuous data protection system.

* * * * *